United States Patent
Cai et al.

(10) Patent No.: US 8,131,266 B2
(45) Date of Patent: Mar. 6, 2012

(54) SHORT MESSAGE SERVICE COMMUNICATION SECURITY

(75) Inventors: Yigang Cai, Naperville, IL (US); Suzann Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 560 days.

(21) Appl. No.: 12/317,052

(22) Filed: Dec. 18, 2008

(65) Prior Publication Data
US 2010/0159962 A1    Jun. 24, 2010

(51) Int. Cl.
  H04M 1/725    (2006.01)
  H04M 1/663    (2006.01)
  H04M 11/10    (2006.01)
  H04W 4/00     (2009.01)

(52) U.S. Cl. ............... 455/412.2; 455/413; 455/466; 370/338; 345/633; 705/16; 705/303; 713/176

(58) Field of Classification Search ........... 455/412.2, 455/413, 466; 370/338; 705/16, 303; 713/176
See application file for complete search history.

(56) References Cited

U.S. PATENT DOCUMENTS

| | | | |
|---|---|---|---|
| 2010/0159962 A1* | 6/2010 | Cai et al. ................. | 455/466 |
| 2011/0093351 A1* | 4/2011 | Afana ..................... | 705/16 |
| 2011/0093400 A1* | 4/2011 | Waite ..................... | 705/303 |
| 2011/0093401 A1* | 4/2011 | Waite ..................... | 705/303 |
| 2011/0098021 A1* | 4/2011 | Shaw et al. .............. | 455/412.2 |
| 2011/0098022 A1* | 4/2011 | Shaw et al. .............. | 455/413 |
| 2011/0099381 A1* | 4/2011 | Brown et al. ............. | 713/176 |
| 2011/0102459 A1* | 5/2011 | Hall ....................... | 345/633 |
| 2011/0103356 A1* | 5/2011 | Chandrasekaran ....... | 370/338 |

* cited by examiner

*Primary Examiner* — William D Cumming
(74) *Attorney, Agent, or Firm* — Stephen Wyse

(57) ABSTRACT

A system, method, and device for securely forwarding SMS messages in a communication system, for example in a communication system including an IMS network accessible to wireless devices via a radio access network. The communication system forwards SMS messages from a sending station to a receiving station via a network node. The network node, which may be an SMSC in an IMS network, is operable to determine whether the SMS message is encrypted and whether the intended recipient supports encryption, and then the network node selectively encrypts and decrypts received SMS messages prior to forwarding to the intended recipient; SMS messages received unencrypted are encrypted by the SMS message encrypter/decrypter if the intended recipient supports encryption, and SMS messages received encrypted are decrypted by the SMS message encrypter/decrypter if the intended recipient does not support SMS message encryption. SMS messages intended for a recipient determined not to support SMS message encryption may be stored in a holding database, and an alert send to the intended recipient, if the sender requires that the SMS message be sent only in encrypted form.

17 Claims, 3 Drawing Sheets

SHORT MESSAGE SERVICE COMMUNICATION SECURITY

FIELD OF THE INVENTION

This invention relates generally to the field of wireless communication systems and, more particularly, to a device, system, and method providing enhanced security for SMS (short message service) messages.

BACKGROUND OF THE INVENTION

Communication systems include a large number of interconnected components that enable a mobile or fixed device with network access to communicate with other such devices throughout the network coverage area. In a traditional wireline network, telephones or computers located at a home or business are connected by wire or cable with a central office, or switching center, which arranges for a circuit to be established for each call. These circuits are made by the closing of switches throughout the network until a continuous communication path is formed from the calling party to the called party. The various network switches communicate with each other using an established signaling protocol to properly route the call. The circuit remains in place for the duration of the call; when the call terminates, the switches, lines, and other resources are freed for use in other calls.

A wireless communication system necessarily operates somewhat differently. In a wireless system most, if not all calls are placed using mobile devices, meaning that they must communicate over radio frequency channels with a point of access to the communication network that will direct their calls to the appropriate parties. In addition, mobile users may physically relocate during or between communication sessions. Not unexpectedly, these characteristics impose limitations on the capabilities of wireless networks, at least until some manner of accommodating them in various situations can be developed.

One manner of providing additional capabilities to users in the wireless environment was the introduction of SMS (short message service) messages. SMS messages are short text messages of limited length that may be transmitted very quickly to or from a UE (user equipment) device to the network through an available point of access. Advantageously, this transmission can also be done at any time—meaning that SMS transmissions over wireless channels can take advantage of time periods where the traffic level is otherwise quite low. Since they can be sent very quickly, these low-traffic intervals need not be long in duration, and so in most cases will be encountered on an adequate basis without unduly delaying the transmission of the SMS message.

SMS messages have since their introduction become a popular form of communication. Not only can wireless network operators take advantage of the way in which the messages are communicated to the network, but two or more users can communicate effectively even though they are not simultaneously available for a voice call. Indeed, efficient communication is practically enforced by the required brevity of the SMS message. This remains true even though somewhat longer messages are now permitted than was originally the case. The ability to send longer messages has, of course, made SMS messaging even more popular.

Generally speaking, the uses for SMS messages have expanded beyond their original, limited use. As mobile uses across all regions and age segments gain confidence in communicating via text messages, a trend of conducting more sophisticated and personal communications has emerged. Some of these personal communications involve information that the parties would consider confidential, such as financial and medical information. In some cases government agencies, banks or other financial institutions, schools, doctors and hospitals, and so forth, are using text messages to conduct business between themselves and customers or patients. Security is therefore becoming an important consideration—certainly more important than when SMS messaging first began. In many applications it is essential.

While various communication network protocols provide general security for SMS, there remains a danger that a hacker or network service person may be able to observe the content of the messages as they pass through the network. Needed therefore is a manner of ensuring a higher degree of security for SMS messages, especially those transmitted for the purpose of conducting business transactions or exchanging other types of confidential information.

SUMMARY OF THE INVENTION

The present invention is directed to a manner of enhancing communication through SMS (short message service) messaging by improving security. This is expected to be particularly advantageous in applications involving financial institutions and medical facilities and in other situations where privacy is a concern.

In one aspect, the present invention is a network node for forwarding SMS messages in a communication system, the network node including a network interface for receiving and forwarding SMS messages, a recipient determiner for determining the intended recipient of the SMS message, and whether the intended recipient supports or in some cases whether it requires SMS message encryption. The network node also includes an SMS message encryption detector for detecting whether the received SMS message is encrypted and a message encrypter/decrypter for selectively encrypting and decrypting SMS messages prior to forwarding them to the intended recipient. In a preferred embodiment, SMS messages received unencrypted are encrypted by the SMS message encrypter/decrypter if the intended recipient requires encryption, and SMS messages received encrypted are decrypted by the SMS message encrypter/decrypter if the intended recipient does not support SMS message encryption. In some embodiments, the sender of an SMS message may have the option of requiring encryption, and SMS messages received in the network node may, if the intended recipient does not support encryption, forward the SMS message to an SMS message holding database. When that occurs, the intended recipient is preferably notified and provided with instructions on how to receive the SMS message in an alternate manner or using a device that does support encryption. The network node may be, for example, an SMSC (short message service center) in an IMS (IP (Internet protocol) multimedia subsystem) network.

In another embodiment, there is provided a method for handling SMS messages in a communication system that includes the steps of receiving an SMS message in a communication-system node, determining the intended recipient of the SMS message, determining whether the intended recipient supports SMS message encryption and, if so, whether the intended recipient requires SMS message encryption. Note that in some embodiments, SMS message encryption will be verified or performed by the node for all intended recipients that support encryption. In these embodiments, a separate determination of whether the recipient requires encryption is not needed. The encryption capabilities and requirements of the intended recipient may be made by query to an SMS user database in the communications-system node, to a central network database such as an HSS (home subscriber server) in an IMS network, or to the intended recipient. The method also includes the steps of detecting whether the received SMS message is encrypted and, prior to forwarding the SMS message to the intended recipient, encrypting SMS messages that have been received unencrypted if the intended recipient requires, or, in some cases, simply supports encryption, and also decrypting SMS messages received as encrypted if the intended recipient does not support SMS message encryption. In a preferred embodiment, the method also includes determining whether the sender requires SMS message encryption and, if so, forwarding messages intended for an intended recipient that does not support encryption to an SMS message holding database for storage until retrieved by the intended recipient in an approved fashion, such as through a secure Web site, or until a maximum storage time, if any, expires. In this embodiment, the method also includes sending an alert to the user that the SMS message is being held.

In still another embodiment, there is provided secure SMS communication system including a RAN (radio access network) for sending and receiving SMS messages to and from UE (user equipment) devices, the network node in communication with the RAN, the network node including a network interface for receiving and forwarding SMS messages, recipient determiner for determining the intended recipient of the SMS message, and whether the intended recipient supports or in some cases whether it requires SMS message encryption. The network node of the communication system also includes an SMS message encryption detector for detecting whether the received SMS message is encrypted and a message encrypter/decrypter for selectively encrypting and decrypting SMS messages prior to forwarding them to the intended recipient. In a preferred embodiment, SMS messages that are received unencrypted are encrypted by the SMS message encrypter/decrypter if the intended recipient requires encryption, and SMS messages that are received encrypted are decrypted by the SMS message encrypter/decrypter if the intended recipient does not support SMS message encryption. In some embodiments, the sender of an SMS message may have the option of requiring encryption, and SMS messages received in the network node may, if the intended recipient does not support encryption, forward the SMS message to an SMS message holding database. When that occurs, the intended recipient is preferably notified and provided with instructions on how to receive the SMS message in an alternate manner or using a device that does support encryption. The network node may be, for example, an SMSC in an IMS network.

BRIEF DESCRIPTION OF THE DRAWINGS

The foregoing and other advantages of the invention will become apparent upon reading the following detailed description and upon reference to the drawings, in which.

DESCRIPTION OF THE PREFERRED EMBODIMENT(S)

The present invention is directed to enhancing communications by providing greater security and the protection of privacy, particularly for the transmission of SMS (short message service) messages via wireless networks. The invention is expected to be especially advantageous in networks operating according to an IMS (IP (Internet protocol) multimedia subsystem) architecture, but is also applicable to other networks, such as those operating in accordance with CDMA or GSM standards. As an example, implementation in an IMS network will now be described with reference to FIG. 1.

Figure 1:
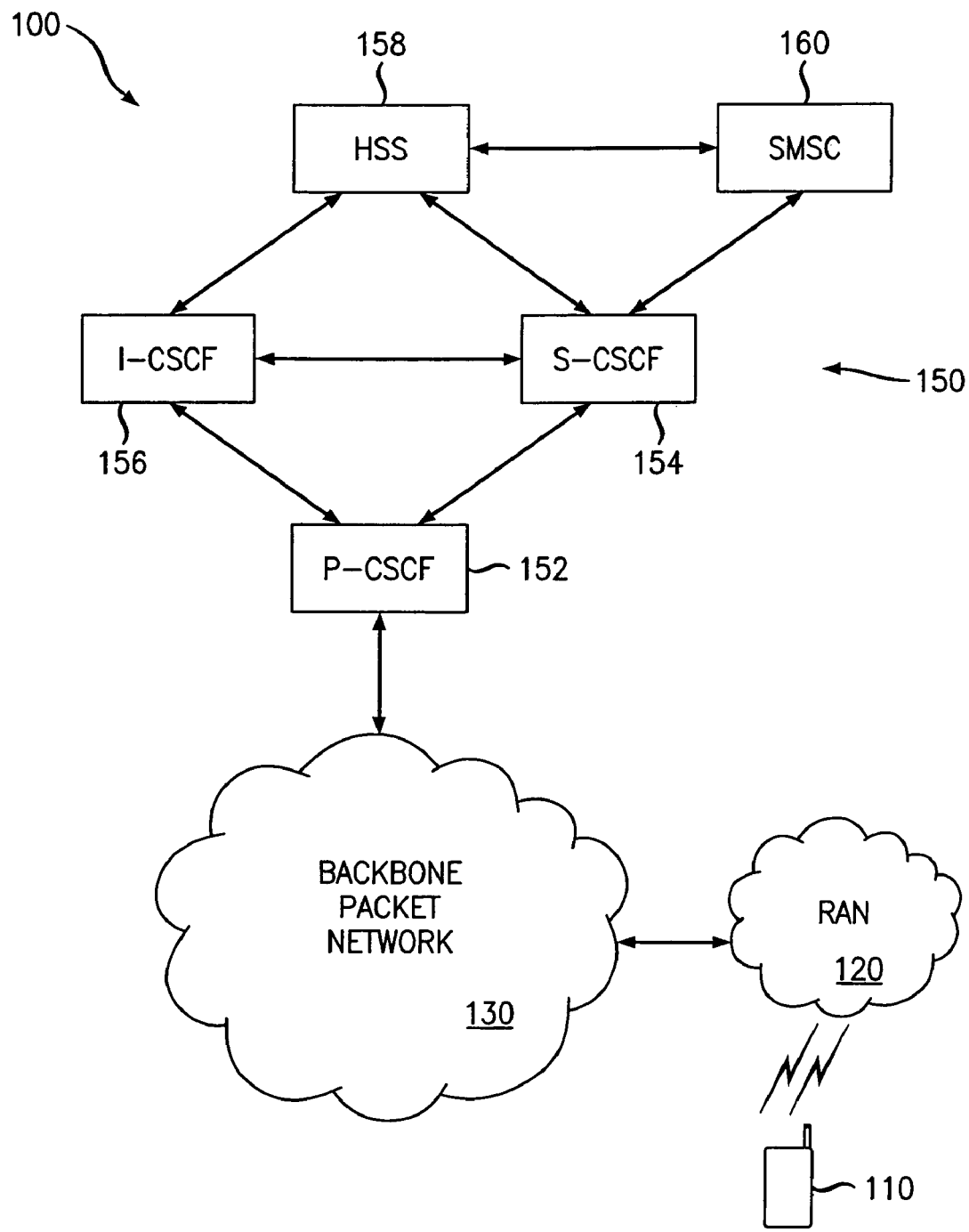
FIG. 1 is a simplified block diagram of a communication system illustrating a communication system network in which the present invention may be implemented according to an embodiment of the present invention.

FIG. 1 is a simplified block diagram of a communication system 100, which includes an IMS network 150 in which the present invention may be implemented according to an embodiment of the present invention. Communication system 100, in this embodiment, includes a RAN (radio access network) 120 for communicating with UE device 110. A RAN typically consists of a number of antennas and base stations for transmitting and receiving radio frequency signals to and from a large number of UE devices. No particular access network configuration is required, however, although the RAN is capable of carrying encrypted SMS messages in accordance with the present invention.

UE 110 is illustrated in FIG. 1 as a mobile device, such as a mobile telephone or PDA (personal digital assistant), but in some instances may also be operating temporarily or permanently from a fixed location. It should also be noted that in many sessions, UE 110 may be communicating via communication system 100 with a fixed station (not shown) such as one located at a financial institution, retail outlet, or medical facility. In accordance with this embodiment of the present invention, UE 110 must, however, be able to send or receive SMS messages, and preferably is operable to encrypt those SMS messages it transmits and decrypt those that it receives. An exemplary UE is illustrated in FIG. 3.

Figure 3:
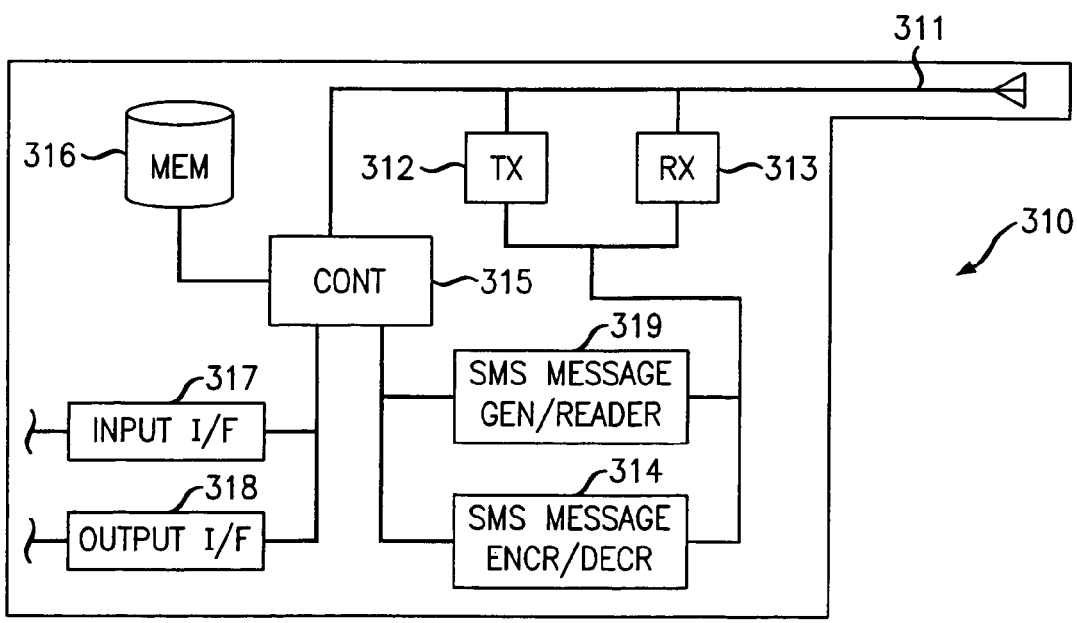
FIG. 3 is a simplified block diagram illustrating selected components of a UE device configured according to an embodiment of the present invention.

FIG. 3 is a simplified block diagram illustrating selected components of a UE 310 configured according to an embodiment of the present invention. In the embodiment of FIG. 3, UE 310 includes transmission circuitry 312, receive circuitry 313, and an antenna 311 for sending and receiving radio frequency signals. Transmission circuitry 312 and receive circuitry 313 operate under the control of controller 315. Although for clarity shown as separate devices, they may of course be located within the same physical component. In a typical UE, voice communications are facilitated using these components, as is the signaling required for, for example, registration or call set up. In this embodiment, these components also facilitate the sending and receipt of SMS messages. SMS message generator/reader 319, again shown separately for purposes of illustration, is operable to form SMS messages for transmission and to interpret those that are received.

In a preferred embodiment, as shown in FIG. 3, UE 310 also includes an SMS message encrypter/decrypter 314 for encrypting SMS messages that are formed by SMS message generator/reader 319, and for decrypting received SMS messages and presenting them to the SMS message generator/reader 319 to be read. No particular encryption algorithm is required according to the present invention, although in many implementations network operators may require the use of certain standard algorithms.

Also shown in FIG. 3 are input interface 317 and output interface 318. Input interface 317 is controlled by controller 315 and receives input commands and data from, for example, a keyboard or microphone (not shown). Output interface 318, also controlled by controller 315, drives for example a video display and audio speaker (also not shown). As should be apparent, SMS messages may be formed in the SMS message generator/reader 319 based on input entered by a user on a keyboard of UE 310 via input interface 317. Similarly, received SMS messages may be presented on a video display via output interface 318. Finally, also shown in communication with controller 315 is memory device 316 for storing program instructions and data associated with, for example, the sending and receiving of SMS messages.

Returning to FIG. 1, in this embodiment communication system 100 also includes a backbone packet network 130. In relation to the present invention, backbone packet network 130 is simply the transport network for routing traffic and signaling between RAN 120 and IMS network 150. Although not shown, there are of course typically many other access networks, gateways (note shown), and other networks that also communicate with backbone network 130 for this purpose.

The IMS network architecture was developed to manage multimedia transmissions in IP (Internet protocol) networks, but recently has come into a more broad application to many different kinds of services. SMS messages may, for example, be transmitted via an IMS network. In the embodiment of FIG. 1, backbone network 130 communicates with IMS network 150 via a P-CSCF (proxy-call session control function) 152. The P-CSCF 152 acts as a monitor for messages entering the IMS network, and communicates with I-CSCF (interrogating-CSCF) 156 and S-CSCF (serving-CSCF) 154 to properly route incoming messages to their intended destination. The HSS (home subscriber server) 158 is a master database for the IMS and holds user profiles and other subscriber information. In a typical IMS network, communication among the illustrated nodes is accomplished according to the SIP (session initiation protocol), except that communications between the CSCFs and the HSS 158 are governed by a protocol known as Diameter.

When SMS messages are routed, the SMSC (short message service center) 160 is used to receive and forward them. In the embodiment of FIG. 1, the SMSC 160 communicates with the S-CSCF 154 of the IMS network 150. SMSC 160 also communicates with HSS 158 (typically according to a Diameter protocol), where the SMSC 160 may be able to obtain information about whether a particular network subscriber device supports encryption and, if so, particulars about that encryption such as whether encryption is required, what type of encryption is used, whether a transport key is required, and so forth. Of course, the SMSC 160 may also communicate with HSS 158 to obtain information necessary for routing SMS messages when it is ready to forward them. Operation of an SMSC according to the present invention will now be discussed in greater detail.

Figure 2:
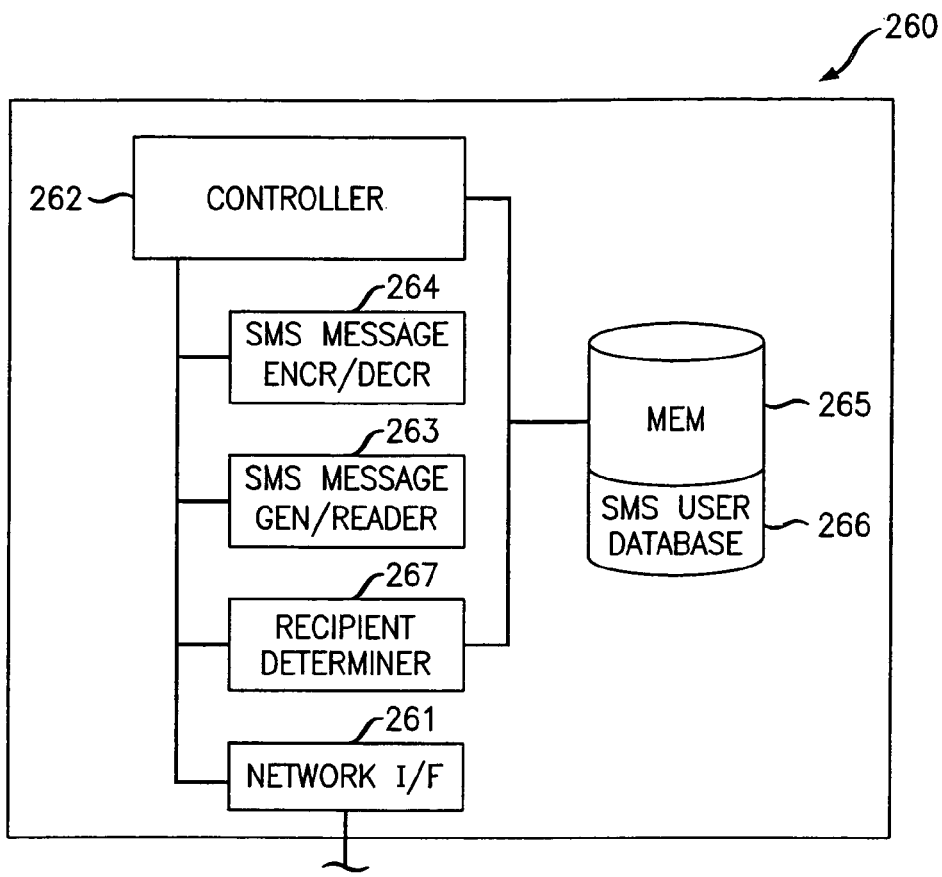
FIG. 2 is a simplified block diagram illustrating selected components of an SMCS, such as the one shown in FIG. 1, configured according to an embodiment of the present invention.

FIG. 2 is a simplified block diagram illustrating selected components of an exemplary SMCS 260 configured according to an embodiment of the present invention. SMSC 260 includes a network interface 261 that handles communications with the IMS network in order to, among other things, receive and forward SMS messages. Recipient determiner 267 examines received SMS messages to determine the identity of the intended recipient. In this embodiment, the recipient determiner also seeks to determine whether the intended recipient supports or requires SMS message encryption according to the present invention. This determination may be made by resort to SMS user database 266, here resident in the memory device 265 of SMSC 260. The recipient determiner may also query an HSS, such as HSS 158 shown in FIG. 1. In some embodiments, the intended recipient may be queried as well.

The SMSC 260 of FIG. 2 also includes an SMS message generator/reader 263 for generating and reading SMS messages during the performance of its functions. In accordance with this embodiment of the present invention, SMS message generator/reader 263 also determines when necessary whether a received SMS message is encrypted and, if possible, determining the type of encryption used. SMS message encrypter/decrypter 264 is used to encrypt and decrypt received SMS messages, as necessary according to the present invention, prior to their being forwarded to the intended recipient. This aspect of the present invention is described more fully below in reference to FIG. 4. In an alternate embodiment (not shown in FIG. 2), the SMSC 260 may also have an SMS message holding database, for example on memory device 265, for storing SMS message that for some reason cannot be forwarded immediately (or at all). In this alternate embodiment, SMSC 260 also includes an alert generator for sending an alert to the intended recipient informing them that the message is being held, and perhaps providing instruction on how to view the message, or at least how to contact the sender. The components of SMSC 260 described above all operate under the control of controller 262. And while each of these components is separately shown in FIG. 2, some or all of them may also in some embodiments be incorporated together. In addition, some of the components may also reside in a different physical location than the SMSC 260.

Figure 4:
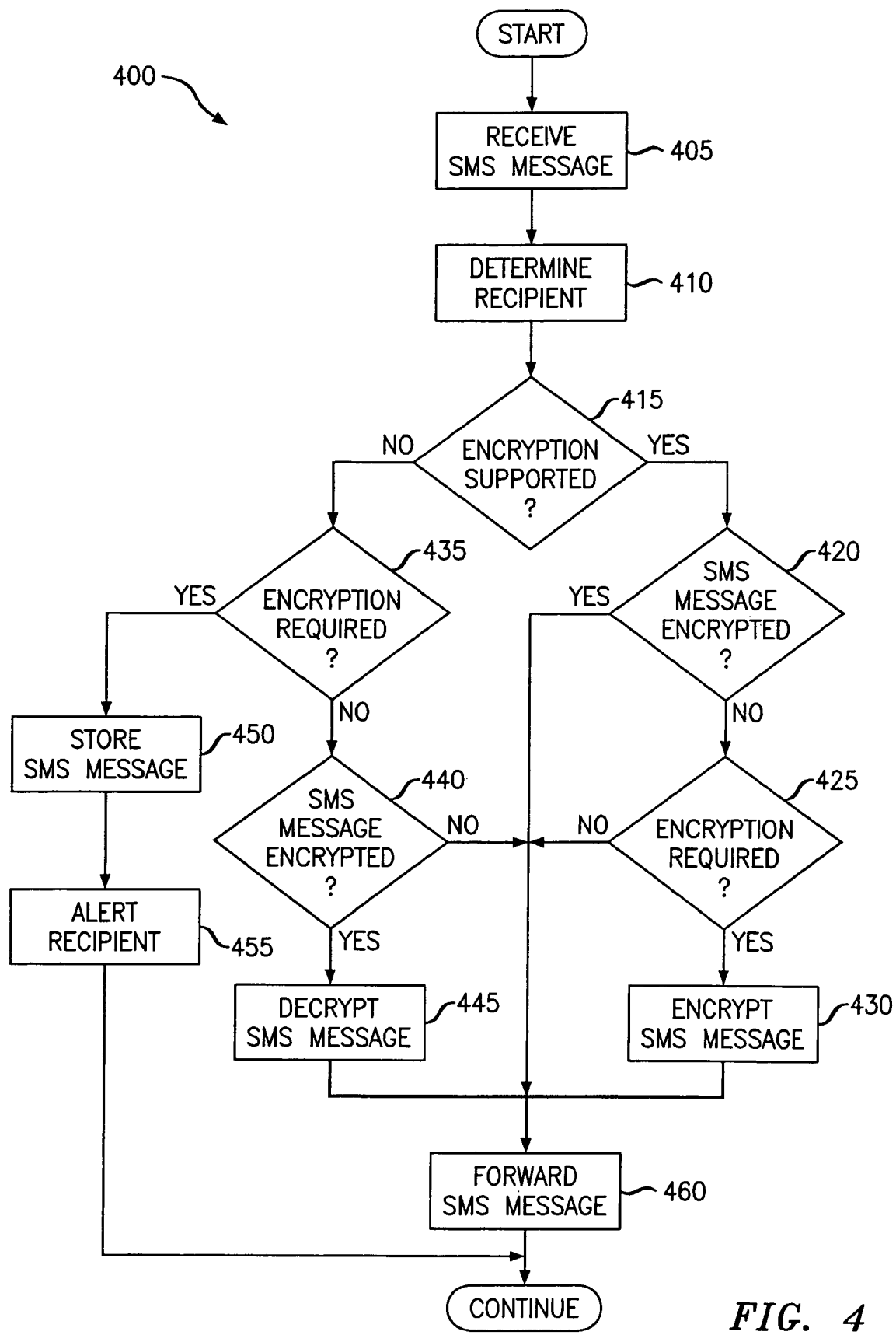
FIG. 4 is a flow diagram illustrating a method for transmitting SMS messages in a communication system according to an embodiment of the present invention.

A method 400 of securely transmitting an SMS message via a wireless communication system will now be described in more detail with reference to FIG. 4. FIG. 4 is a flow diagram illustrating a method for transmitting SMS messages in a communication system according to an embodiment of the present invention.

In the embodiment of FIG. 4, at START it is presumed that the components necessary for performing the illustrated process according to the present invention are both available and operational. No particular component is required, however, unless explicitly stated or apparent from the context. Exemplary components operational according to the present invention are illustrated in FIGS. 1-3 and have been discussed above.

The process of FIG. 4 then begins with receiving an SMS message (step 405) from a sending party via an access network that forms a part of the wireless communication system. The access network, detecting that the communication is an SMS message, forwards (step not separately shown) the message to the appropriate SMSC. In the embodiment of FIG. 1, for example, an SMS message from UE 110 received at RAN 120 would be forwarded to the backbone packet network 130, and from there to SMSC 160 via P-CSCF 152 and S-CSCF 154. In other networks of course, a different path or forwarding strategy may be employed.

In the embodiment of FIG. 4, when the SMSC receives the SMS message at step 405, it examines the message to determine (step 410) the identity of the intended recipient. It then determines (step 415) whether the intended recipient supports SMS message encryption.

It is noted that these determinations may be made in a number of ways, in accordance with the present invention, though making them in a particular fashion is not a requirement of the invention unless explicitly stated or apparent from the context. In general, it is presumed that determining the intended recipient at step 410 is in many implementations easily performed by examining the SMS message itself. In order to determine whether the intended recipient supports encryption, however, this information must either be available in a database accessible to the SMSC, or queried from the intended recipient. If the latter, the information presumably theretofore unknown will preferably be added to a database for future reference.

The database, for example, may be resident in the HSS 158 (shown in FIG. 1) as part of the profile of registered users. Preferably, information necessary or desirable for performing the method of the present invention is updated when a UE device registers. The information may also be maintained in SMS user database 266 (shown in FIG. 2). In some implementations, SMS message user information may be selectively stored, such as for financial institutions or medical facilities or for users identified as frequent intended recipients. In other embodiments, special addresses or other identifiers may be associated with recipients that support or require encryption so that this information may be gleaned from the received SMS message itself.

Naturally, it is preferable that each sending and receiving party support, that is, have the ability to encrypt and decrypt SMS messages. This will not always be the case, however, especially in the near future. In addition, since various encryption algorithms have been developed, it is possible that two parties having encryption capabilities may not be compatible. Of course, parties such as banks and hospitals that expect to send and receive a great deal of encrypted SMS traffic may be able to employ more than one encryption algorithm. For this reason it is sometimes preferable that where applicable the SMSC also determine what type or types of encryption may be used. In other implementations the network provider may simply stipulate the encryption algorithm that is to be used.

Returning to FIG. 4, if it is determined at step 415 that the intended recipient supports SMS message, the SMSC determines (step 420) whether the received SMS message is in fact encrypted. It is noted that detecting whether the SMS message is encrypted may be done by examining the message for a flag or other indicia of encryption. If the SMS message encryption algorithm requires a transport key to decrypt, for example, it is preferred that the transport key should be included that the beginning of the encrypted content, separated by a pre-specified separation character. The presence or absence of such a character would of could be a good indicator of whether the SMS message is encrypted, and if applicable an indicator of the type of encryption used as well. In some implementations it may be necessary to query the sender (step not shown) to determine if the SMS message is encrypted, but this method is not presently preferred. It is also noted that while shown in a particular sequence in FIG. 4, detecting whether an SMS message has been encrypted may be done at any time after it is received.

If it is determined at step 415 that the intended recipient of an SMS message supports SMS message encryption, and at step 420 that the received SMS message is encrypted, then the SMS message is forwarded to its intended recipient (step 460). Note that in the embodiment of FIG. 4, it is presumed that one form of encryption algorithm is in use. If multiple encryption algorithms are available for use, the SMS message is simply forwarded if it is encrypted according to an algorithm supported by the intended recipient. Once the message is forwarded at step 460, normal routing procedures are followed within the communication system and the SMSC or other network node awaits the arrival of the next SMS message.

If it is determined at step 420 that the received SMS message is not encrypted, then the SMSC determines if the intended recipient requires encryption (step 425). As alluded to above, the intended recipient may require heightened security for SMS communications because of the expected nature of those communications. It is expected that this enhanced-security requirement will remain constant for a particular party, but this is not necessarily the case. In some embodiments (not shown), there may also be certain criteria specified for when encryption is required and when it is not. That is, the SMS message encryption requirement may be conditional. Examples of criteria include the identity of the other party to the communications, the type of equipment that they are using, or an identifier present in the SMS message itself. A user whose UE device does not itself support encryption may be able to in some way specify that unencrypted messages should be encrypted if possible.

If encryption is not required (or otherwise elected, for example by the user), then the SMSC forwards the unencrypted SMS message to the intended recipient (step 460). If SMS message encryption is required, then the SMSC encrypts the message (step 430) prior to forwarding it at step 460. If a transport key is required for the particular encryption algorithm, the SMSC includes it in the forwarded message, preferably at the front of the encrypted content, separated by a pre-specified separation character. Of course, if multiple encryption algorithms are available, the SMSC employs the method required or preferred by the intended recipient or, in some cases, by the system operator. Here it is noted that the steps of determining whether encryption is support or required by the intended recipient may be performed at the same time. At this time a determination (not shown) could also be made, in systems where this is appropriate, as to what types of encryption are supported, preferred, or required. In this vein, it is also noted that while in this embodiment the intended recipient's preferences are given priority; in other embodiments it may be the sender, or certain parties' preference may be given priority regardless of whether they are the sender or the recipient.

If it is determined at step 415 that the intended recipient does not support encryption, then the SMSC determines whether the sender requires SMS message encryption (step 435). Note that in some embodiments, the sender may not have the option of requiring encryption. In the embodiment of FIG. 4, however, it is presumed that this option is available. The determination of step 435 may also include determining to the extent possible any other particulars associated with the encryption if necessary or desirable. The determination of step 435 may include one or more of querying a local database at the SMSC, querying an appropriate HSS, examining the received SMS message itself. In some instances it may also involve sending a query to the sender, although this is not expected to be typical.

In the embodiment of FIG. 4, if it is determined at step 435 that encryption is not required (by the sender), then the SMSC determines whether the received SMS message has been encrypted (step 440). If not, the unencrypted message is forwarded to the intended recipient (step 460). If it is determined at step 440 that the received message is encrypted, then the SMSC decrypts the SMS message (step 445) before forwarding it to the intended recipient at step 460.

If, on the other hand, it is determined at step 435 that encryption is required by the sender, then the SMS message cannot be immediately forwarded (at it was determined at step 415 that the intended recipient does not support encryption). In this embodiment, the received SMS message is instead stored in an SMS message holding database (step 450). This SMS message holding database may be located in the SMSC (for example, in memory device 265 shown in FIG. 2) or in a separate component. If the latter, step 450 also includes forwarding the SMS message to the separate component for storage.

When the SMS message has been sent to an SMS message holding database, an alert is then sent (step 455) to the intended recipient that a confidential SMS message is being held for them. The intended recipient may then access the SMS message in an alternate way (not shown). For example, the intended recipient may be able to log into a secure Web site through the Internet and view the message. Note that at some point, before or after storage, the SMS message may have to be decrypted (not shown) for viewing in an alternate way to be possible. In addition, the alert sent to the intended recipient may include a message indicating who the held SMS message is from, how to log into the secure Web site for access, or alternate ways to contact the sender.

Of course, the intended recipient may also choose to simply ignore the alert. For this reason the held SMS message may be purged from the SMS holding database after a certain period of time has elapsed, perhaps also after sending additional alerts to the intended recipient (steps not shown). In an alternate embodiment (also not shown) the intended recipient may also be able to request that the SMS message be sent to an alternate device, if one that supports encryption is available. In this alternative, after proper authentication of the recipient, the SMS message may be retrieved by the SMSC and forwarded securely to the alternate device.

As should be apparent, the embodiment of FIG. 4 is described from the perspective that a given SMS message will have a single intended recipient. Should step 410 determine that multiple recipients are intended, then the determination of whether the intended recipient supports encryption (step 415) should be performed for each of the intended recipients. The same is true for determining if the intended recipient requires encryption (step 425). If all recipients do not identically support or require encryption, then the remaining operations of the method 400 performed as necessary for each intended recipient (although some steps, for example decrypting an encrypted SMS message, may be done once and the result applied to applicable messages).

Note that in embodiments where multiple encryption algorithms are possible, an SMS message encrypted according to a type of encryption that is not supported by the intended recipient is in this embodiment treated as being addressed to a recipient that does not support encryption at all. In other embodiments (not shown), if the SMSC is capable, an SMS message encrypted according to an unsupported type of encryption algorithm may be decrypted and then, prior to forwarding, re-encrypted using a supported encryption algorithm.

Note also that the method described above is intended to illustrate one embodiment, but other embodiments consistent with the spirit of the invention may be implemented as well. For example, the sequence of steps described above may be performed in any logically-consistent order unless an embodiment specifies a particular sequence. In addition, in some embodiments, the process of the present invention my include steps additional to those described above, in others, some steps may be deemed optional or not performed at all. Finally, it is noted that the functions of the SMSC may be performed in another network or distributed among a number of physical components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A secure SMS (short message service) communication system, comprising:
   a RAN (radio access network) for sending and receiving SMS messages to and from UE (user equipment) devices;
   a network node in communication with the RAN, the network node comprising:
      a network interface for receiving and forwarding SMS messages;
      an SMS message recipient determiner for determining the intended recipient of the SMS message and whether the intended recipient supports SMS message encryption;
      an SMS message encryption detector for detecting whether the received SMS message is encrypted; and
      an SMS message encrypter/decrypter for selectively encrypting and decrypting SMS messages prior to forwarding to the intended recipient, wherein SMS messages received unencrypted are encrypted by the SMS message encrypter/decrypter if the intended recipient supports encryption, and wherein SMS messages received encrypted are decrypted by the SMS message encrypter/decrypter if the intended recipient does not support SMS message encryption.

2. The secure SMS communication system of claim 1, wherein the network node is an SMSC is an SMSC (short message service center) in an IMS (IP (Internet Protocol) multimedia subsystem) network.

3. The secure SMS communication system of claim 1, wherein the network node is a component in a CDMA (Code Division Multiple Access) network.

4. The secure SMS communication system of claim 1, wherein the network node is a component in a GSM (Global System for Mobile Communications) network.

5. A method of handling SMS messages in a communication system, comprising:
   receiving an SMS message in a communication-system node;
   determining the intended recipient of the SMS message;
   determining whether the intended recipient supports SMS message encryption;
   determining, if the intended recipient supports SMS message encryption and, if so, whether the intended recipient requires SMS message encryption; and
   detecting whether the received SMS message is encrypted;
   wherein prior to forwarding SMS messages to an intended recipient, SMS messages received unencrypted are encrypted by the node if the intended recipient requires encryption, and wherein SMS messages received encrypted are decrypted by the node if the intended recipient does not support SMS message encryption.

6. The method of claim 5, further comprising forwarding the SMS message to the intended recipient.

7. The method of claim 5, further determining if the sender of the SMS message requires encryption and, if so, storing the SMS message in an SMS message holding database if the intended recipient does not support SMS message encryption.

8. The method of claim 7, further comprising sending an alert to the intended recipient if the SMS message is stored in an SMS message holding database.

9. The method of claim 5, wherein the SMS message is received from a UE (user equipment) device via a wireless access network.

10. The method of claim 9, wherein the UE comprises an SMS message encryptor/decryptor and further comprising the step of encrypting the SMS message in the UE.

11. The method of claim 5, wherein the communication system comprises an IMS network, and wherein determining whether the intended recipient supports encryption comprises querying an HSS (home subscriber server) of the IMS network.

12. A network node for handling SMS messages in a communication system, comprising:
- a network interface for receiving and forwarding SMS messages;
- an SMS message recipient determiner for determining the intended recipient of the SMS message and whether the intended recipient supports or requires SMS message encryption;
- an SMS message encryption detector for detecting whether the received SMS message is encrypted; and
- an SMS message encrypter/decrypter for selectively encrypting and decrypting SMS messages, wherein SMS messages received unencrypted are encrypted by the SMS message encrypter/decrypter if the intended recipient requires encryption, and wherein SMS messages received encrypted are decrypted by the SMS message encrypter/decrypter if the intended recipient does not support SMS message encryption.

13. The network node of claim 12, wherein the communication system comprises an IMS network.

14. The network node of claim 13, wherein the network node is an SMSC.

15. The network node of claim 12, further comprising an SMS holding database for storing received SMS messages for which the sender requires encryption if the SMS message recipient determiner determines that the intended recipient does not support encryption.

16. The network node of claim 15, further comprising an alert generator for sending an alert to the intended recipient of an SMS message is stored in the SMS holding database.

17. The network note of claim 12, wherein the SMS message detector is arranged to detect the type of encryption used to encrypt encrypted SMS messages.

* * * * *